(12) United States Patent
Sho et al.

(10) Patent No.: US 11,059,530 B2
(45) Date of Patent: Jul. 13, 2021

(54) TRAVELING UNIT AND WORK VEHICLE

(71) Applicant: KOMATSU LTD., Tokyo (JP)

(72) Inventors: Tomoyoshi Sho, Kyotanabe (JP);
Kenichi Hisamatsu, Hirakata (JP);
Hisao Asada, Kyotanabe (JP)

(73) Assignee: KOMATSU LTD., Tokyo (JP)

( * ) Notice: Subject to any disclaimer, the term of this patent is extended or adjusted under 35 U.S.C. 154(b) by 366 days.

(21) Appl. No.: 15/753,650

(22) PCT Filed: Oct. 22, 2015

(86) PCT No.: PCT/JP2015/079854
§ 371 (c)(1),
(2) Date: Feb. 20, 2018

(87) PCT Pub. No.: WO2017/068688
PCT Pub. Date: Apr. 27, 2017

(65) Prior Publication Data
US 2018/0281879 A1    Oct. 4, 2018

(51) Int. Cl.
*B62D 55/13* (2006.01)
*B62D 55/21* (2006.01)
*B62D 55/12* (2006.01)
*B62D 55/06* (2006.01)
*B62D 55/08* (2006.01)
*E02F 9/02* (2006.01)

(52) U.S. Cl.
CPC ............ *B62D 55/13* (2013.01); *B62D 55/06* (2013.01); *B62D 55/08* (2013.01); *B62D 55/12* (2013.01); *B62D 55/21* (2013.01); *E02F 9/02* (2013.01)

(58) Field of Classification Search
CPC ........ B62D 55/12; B62D 55/13; B62D 55/21; B62D 55/06; B62D 55/08
See application file for complete search history.

(56) References Cited

U.S. PATENT DOCUMENTS

| 2,302,658 | A | * | 11/1942 | Artz | B62D 55/12 |
| | | | | | 305/100 |
| 2,530,379 | A | | 11/1950 | Davidson et al. | |
| 3,680,928 | A | | 8/1972 | Kraschnewski et al. | |
| 3,680,929 | A | * | 8/1972 | Hnilicka | B62D 55/096 |
| | | | | | 305/201 |
| 6,120,405 | A | * | 9/2000 | Oertley | B62D 55/12 |
| | | | | | 305/196 |
| 6,220,378 | B1 | * | 4/2001 | Oertley | B62D 55/12 |
| | | | | | 180/9.62 |
| 6,883,876 | B2 | * | 4/2005 | Yamamoto | B62D 55/088 |
| | | | | | 305/115 |

(Continued)

FOREIGN PATENT DOCUMENTS

| JP | S46-6759 A | 12/1971 |
| JP | 2003-127916 A | 5/2003 |

(Continued)

*Primary Examiner* — Kip T Kotter
(74) *Attorney, Agent, or Firm* — Faegre Drinker Biddle & Reath LLP (57) ABSTRACT

A traveling unit includes a drive wheel and track links. The drive wheel includes a plurality of drive wheel teeth and a tooth groove which is disposed adjacently to the drive wheel teeth. The track link includes projection portions which mesh with the drive wheel teeth. The projection portion has a height h greater than or equal to a depth d of the tooth groove.

11 Claims, 9 Drawing Sheets

(56) References Cited

U.S. PATENT DOCUMENTS

| | | |
|---|---|---|
| 7,798,579 B2 | 9/2010 | Mulligan |
| 10,308,297 B2* | 6/2019 | Mizusawa ............ B62D 55/244 |
| 10,392,061 B2* | 8/2019 | Mizusawa ............ B62D 55/253 |
| 2004/0012260 A1 | 1/2004 | Yamamoto et al. |
| 2014/0042801 A1* | 2/2014 | Shimozono .......... B62D 55/244 |
| | | 305/165 |
| 2014/0346856 A1* | 11/2014 | Colwell ............... B62D 55/202 |
| | | 305/185 |

FOREIGN PATENT DOCUMENTS

| | | |
|---|---|---|
| JP | 2003-285781 A | 10/2003 |
| JP | 2004-66968 A | 3/2004 |

\* cited by examiner

Related Art

TRAVELING UNIT AND WORK VEHICLE

TECHNICAL FIELD

The present invention relates to a traveling unit and a work vehicle.

BACKGROUND ART

A track-type work vehicle such as a hydraulic excavator includes a traveling unit, a revolving unit, and a work implement mounted on the revolving unit. The traveling unit includes drive wheels (sprocket wheels), idler wheels (idler tumblers), rollers, track apparatuses, and the like.

A track apparatus is wound around an idler tumbler and a sprocket wheel. The track apparatus can be rotatably driven by making teeth of the sprocket wheel mesh with the track apparatus and by rotating the sprocket wheel. In general, the track apparatus is configured such that a plurality of track links are connected to each other in an endless manner (annular manner) using pins and bushings, and track shoe plates (shoes) are mounted on the plurality of track links.

In a traveling unit of a large-sized vehicle, a track apparatus of a type where a track shoe plate and a link are integrally formed is adopted. The track apparatus of this type is disclosed in Japanese Patent Laying-Open No. 46-6759, for example.

In this publication, the track link includes a tumbler engaging surface, and tooth portions positioned on both sides of the tumbler engaging surface. On the other hand, a drive tumbler includes a rolling surface, and tumbler teeth positioned on both sides of the rolling surface. By rotatably driving the drive tumbler in a state where the tooth portions of the track links and tumbler teeth of the drive tumbler mesh with each other, an endless belt formed by connecting the plurality of track links in an endless manner is rotatably driven. During this rotary driving of the endless belt, a tumbler engaging surface of the track link and the rolling surface of the drive tumbler are brought into contact with each other in a rolling manner.

CITATION LIST

Patent Document

PTD 1: Japanese Patent Laying-Open No. 46-6759

SUMMARY OF INVENTION

Technical Problems

In the above-mentioned publication, sliding abrasion occurs between the tumbler engaging surface of the track link and the rolling surface of the drive tumbler. Accordingly, abrasion between the tumbler engaging surface of the track link and the rolling surface of the drive tumbler is large compared to abrasion of other parts.

A winding diameter of the track link on the drive tumbler depends on either one of (a) a contact between the tumbler engaging surface of the track link and the rolling surface of the drive tumbler, and (b) a relationship between a connection pitch of the track links and a pitch of the tumbler teeth. Accordingly, a meshing pitch is displaced due to the difference in abrasion speeds of the respective parts and hence, defective meshing is liable to occur. This defective meshing causes abnormal abrasion.

The present invention has been made to overcome the above-mentioned drawbacks. It is an object of the present invention to provide a traveling unit and a work vehicle where sliding abrasion during rotation of a drive wheel can be suppressed, and abnormal abrasion attributed to defective meshing can be suppressed.

Solutions to Problems

A traveling unit according to the present invention includes a drive wheel and track links. The drive wheel has a plurality of drive wheel teeth and a tooth groove disposed adjacently to the drive wheel teeth. The track link has projection portions which mesh with the drive wheel teeth, and a rail surface positioned in a width direction of the projection portions. A height of the projection portion from the rail surface is set greater than or equal to a depth of the tooth groove.

According to the traveling unit of the present invention, the projection portion has a height greater than or equal to a depth of the tooth groove. With such a configuration, a distal end of the projection portion is capable of contacting with a bottom portion of the tooth groove. Accordingly, it is possible to prevent the rail surface of the track link and an outer peripheral surface of the drive wheel which opposedly faces the rail surface from coming into contact with each other. As a result, it is possible to prevent sliding abrasion between the rail surface of the track link and the above-mentioned outer peripheral surface of the drive wheel.

Further, sliding abrasion between the rail surface of the track link and the outer peripheral surface of the drive wheel can be prevented as described above and hence, it is possible to suppress displacement of a meshing pitch caused by difference in abrasion speeds of the respective parts. Accordingly, abnormal abrasion attributed to defective meshing can be suppressed.

In the above-mentioned traveling unit, the outer peripheral surface of the drive wheel which opposedly faces the rail surface and is positioned in a tooth width direction of the drive wheel teeth in a state where the drive wheel teeth and the projection portions mesh with each other has a diameter less than or equal to a tooth tip circle diameter of the drive wheel teeth over the entire circumference.

With such a configuration, it is possible to surely prevent a contact between the rail surface of the track link and the outer peripheral surface of the drive wheel which opposedly faces the rail surface. Accordingly, it is possible to surely prevent sliding abrasion between the rail surface of the track link and the above-mentioned outer peripheral surface of the drive wheel.

In the above-mentioned traveling unit, the drive wheel includes a drive wheel body, drive wheel segments, and fixtures. The drive wheel segment is formed as a part separate from the drive wheel body, is disposed on an outer periphery of the drive wheel body, and has a drive wheel tooth. The fixture mounts the drive wheel segment on the drive wheel body.

With such a configuration, when the drive wheel segment is broken or is abraded due to meshing with the track link or the like, the drive wheel segment can be exchanged by removing the drive wheel segment from the drive wheel body. Accordingly, it is unnecessary to exchange the whole drive wheel.

In the above-mentioned traveling unit, the drive wheel body has recessed portions indented toward an inner peripheral side on an outer peripheral portion thereof. In a state where the drive wheel segment is mounted on the drive wheel body, the recessed portion is brought into contact with the drive wheel segment.

With such a configuration, when the traveling unit is driven due to meshing of the drive wheel segment with the track link, a load which acts on the drive wheel segment from the track link (for example, a falling load or a tractional load) can be received by the recessed portion of the drive wheel body. Accordingly, it is possible to prevent the above-mentioned load from acting on the fixture and hence, durability can be enhanced.

In the above-mentioned traveling unit, the drive wheel body has a plurality of protrusions projecting toward an outer peripheral side on an outer peripheral portion. The drive wheel segment has a plurality of indented portions which are indented such that the indented portions extend toward an outer peripheral side from an inner peripheral surface of the drive wheel segment, and respectively receive the protrusions. The plurality of indented portions each open on an outer peripheral surface of the drive wheel segment.

As described above, the indented portions which receive the protrusions of the drive wheel body open on the outer peripheral surface of the drive wheel segment. Accordingly, a stress which acts on the drive wheel segment can be released by the opening and hence, it is possible to suppress breakage of the drive wheel segment.

In the above-mentioned traveling unit, the plurality of protrusions are arranged such that each of the plurality of protrusions overlap with a corresponding one of the plurality of drive wheel teeth as viewed in a side view.

With such a configuration, the protrusions of the drive wheel body and the drive wheel teeth can be fixed to each other.

In the above-mentioned traveling unit, the fixture fixes the drive wheel tooth and the protrusion of the drive wheel body to each other.

Accordingly, the fixture can be arranged while avoiding the tooth groove and hence, there is no possibility that the fixture obstructs fitting of the projection portion of the track link into the tooth groove.

In the above-mentioned traveling unit, the track link has a first link connection hole and a second link connection hole. As viewed in a side view, the projection portion is arranged at the center between the first link connection hole and the second link connection hole.

With such a configuration, even when the drive wheel is rotated either toward a normal rotation side or a reverse rotation side, it is possible to suppress relative sliding of the track link with respect to the drive wheel. In the above-mentioned traveling unit, the projection portion has a straight line portion positioned on a peak portion of the projection portion and two arcuate portions which sandwich the straight line portion therebetween as viewed in a side view.

With such a configuration, it is possible to make all projection portions fitted in the tooth grooves mesh with the drive wheel teeth.

In the above-mentioned traveling unit, as viewed in a side view, an angle of rising from a groove end portion to a bottom portion side of the tooth groove with respect to a first imaginary straight line which connects the groove end portions on both sides of the tooth groove is set smaller than an angle of rising from a root portion to a distal end portion side of the projection portion with respect to a second imaginary straight line which connects the root portions on both sides of the projection portion.

With such a configuration, the tooth groove can smoothly receive the projection portion and hence, it is possible to realize smooth meshing between the drive wheel and the track links.

The work vehicle according to the present invention includes the traveling unit described in any one of the above-mentioned paragraphs.

According to the work vehicle of the present invention, as described above, it is possible to suppress sliding abrasion during rotation of the drive wheel and, at the same time, it is possible to suppress abnormal abrasion attributed to defective meshing.

Advantageous Effects of Invention

As has been described heretofore, the present invention can realize a traveling unit and a work vehicle where sliding abrasion during rotation of a drive wheel can be suppressed and abnormal abrasion attributed to defective meshing can be suppressed.

DESCRIPTION OF EMBODIMENTS

Hereinafter, an embodiment of the present invention is described with reference to drawings.

First, a configuration of a work vehicle according to one embodiment of the present invention is described. Hereinafter, with reference to FIG. 1, a hydraulic excavator is described as one example of a work vehicle to which the concept of the present invention is applicable. The present invention is also applicable to a track-type work vehicle such as a crawler dozer besides a hydraulic excavator.

In this embodiment, the positional relationship of respective parts is described with reference to an operator sitting on an operation seat in the inside of an operator's cab 31. Fore/aft directions are frontward and rearward directions with respect to the operator sitting on the operation seat. Leftward and rightward directions (lateral direction) are leftward and rightward directions with respect to the operator sitting on the operation seat. Upward and downward directions are upward and downward directions with respect to the operator sitting on the operation seat.

A direction which opposedly faces the operator sitting on the operation seat from a front side is a frontward direction, and a direction opposite to the frontward direction is a rearward direction. A direction toward a right side and a direction toward a left side when the operator sitting on the operation seat opposedly faces a front side are a rightward direction and a leftward direction respectively. A foot side of the operator sitting on the operation seat is a lower side, and an overhead side of the operator sitting on the operation seat is an upper side.

Figure 1:
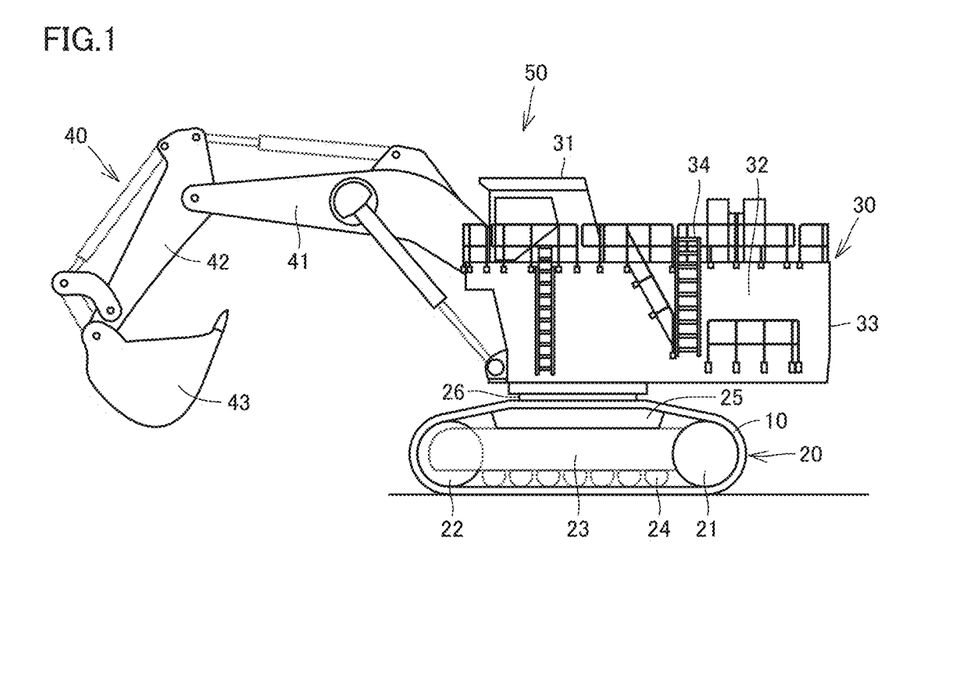
FIG. 1 is a schematic side view showing a configuration of a hydraulic excavator as an example of a track-type work vehicle using a track apparatus according to one embodiment of the present invention.

FIG. 1 is a schematic side view showing a configuration of a hydraulic excavator as an example of a track-type work vehicle using a track apparatus according to one embodiment of the present invention. As shown in FIG. 1, a hydraulic excavator 50 of this embodiment is a large-sized hydraulic excavator, and mainly includes a traveling unit 20, a revolving unit 30, and a work implement 40. A work vehicle body is formed of traveling unit 20 and revolving unit 30.

Revolving unit 30 is mounted on traveling unit 20 in a turnable manner. Revolving unit 30 mainly includes operator's cab 31, an engine compartment 32, a counter weight 33, and an access system 34.

Operator's cab 31 is disposed on left side of a front portion (a front side in a longitudinal direction of a vehicle) of revolving unit 30, for example. Engine compartment 32 and counter weight 33 are respectively disposed on a rear side (a rear side in the longitudinal direction of the vehicle) of revolving unit 30. Engine compartment 32 houses an engine unit (an engine, an exhaust gas processing structural body and the like) therein. An upper portion of engine compartment 32 is covered by an engine hood. Counter weight 33 is disposed behind engine compartment 32.

Access system 34 is disposed on a side portion of revolving unit 30, for example, on a left side of revolving unit 30. Access system 34 is provided for allowing an operator to get in operator's cab 31 from a ground or to get off from operator's cab 31 to the ground.

Work implement 40 is pivotally supported on a front side of revolving unit 30. Work implement 40 includes a boom 41, a dipper stick 42, a bucket 43, hydraulic cylinders and the like, for example. A proximal end portion of boom 41 is connected to revolving unit 30 in a rotatable manner. A proximal end portion of dipper stick 42 is connected to a distal end portion of boom 41 in a rotatable manner. Bucket 43 is connected to a distal end portion of dipper stick 42 in a rotatable manner. Work implement 40 can be actuated by driving boom 41, dipper stick 42, and bucket 43 respectively using hydraulic cylinders.

Traveling unit 20 is configured such that work vehicle (hydraulic excavator) 1 travels by rotating and driving a pair of right and left track apparatuses 10. Traveling unit 20 mainly includes track apparatuses 10, drive wheels (sprocket wheels) 21, idler wheels (idler tumblers) 22, a track frame 23, track rollers 24, carrier rollers 25, and a revolving apparatus 26.

Drive wheel 21 is mounted on a rear end portion of track frame 23 in a rotatable and drivable manner. Idler wheel 22 is mounted on a front end portion of track frame 23 in a rotatable manner. A plurality of track rollers 24 are mounted on a lower side of track frame 23. A plurality of carrier rollers 25 are mounted on an upper side of track frame 23.

Track apparatus 10 is wound around and between drive wheel 21 and idler wheel 22. Track apparatus 10 is supported by track rollers 24 and carrier rollers 25 which are disposed between drive wheel 21 and idler wheel 22. Track apparatus 10 is meshed with drive wheel 21. When drive wheel 21 is rotatably driven in such a state, track apparatus 10 is rotatably driven. With such a configuration, traveling unit 20 travels in a self-propelled manner. When track apparatus 10 is rotatably driven, idler wheel 22, a plurality of track rollers 24 and a plurality of carrier rollers 25 are respectively brought into contact with track apparatus 10 and are rotatable along with track apparatus 10.

Figure 2:
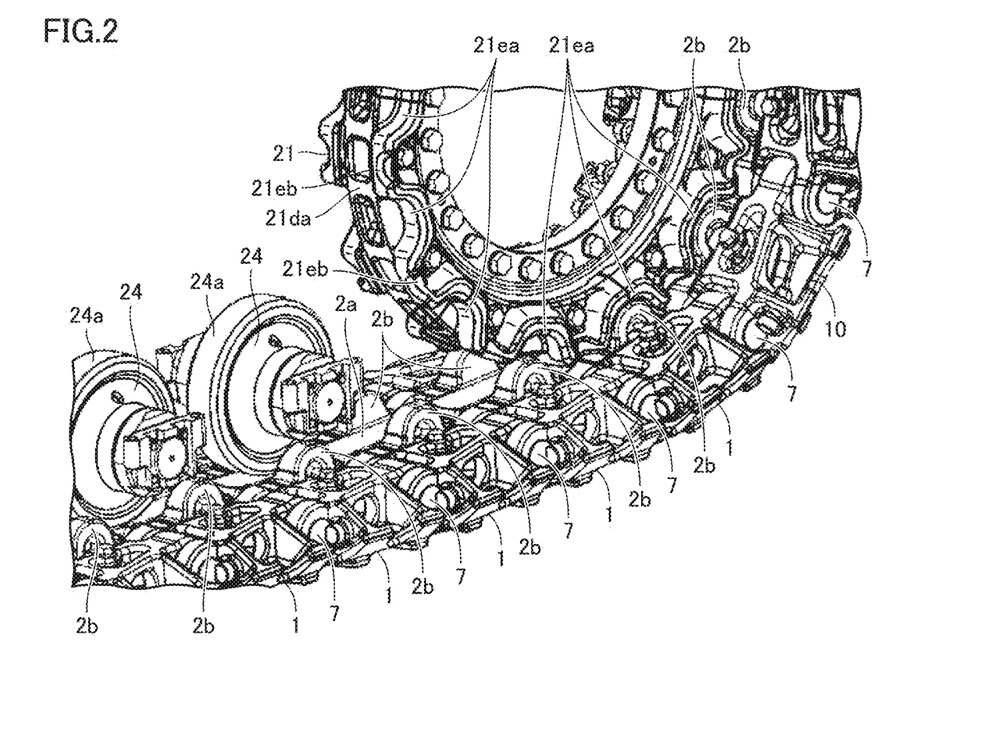
FIG. 2 is a perspective view schematically showing a part of a configuration of a traveling unit of the track-type work vehicle in FIG. 1.

FIG. 2 is a perspective view schematically showing a part of a configuration of the traveling unit of the track-type work vehicle in FIG. 1. As shown in FIG. 2, track apparatus 10 is configured such that a plurality of track links 1 are connected to each other in an endless manner (annularly) by connecting pins 7.

Each of the plurality of track links 1 includes a rail surface 2a, and two projection portions 2b. Two projection portions (projections) 2b are disposed on both sides of a plate portion while sandwiching the plate portion having rail surface 2a therebetween. Rail surface 2a and two projection portions 2b are disposed on an inner surface (non ground-engaging surface) of track apparatus 10 which is formed by connecting track links 1 in an endless manner.

Rail surface 2a is a surface on which rollers (for example, track rollers 24) and the like roll. When track apparatus 10 is rotatably driven, rolling surfaces 24a of the rollers (for example, track rollers 24) and the like are brought into contact with rail surface 2a.

Two respective projection portions 2b are portions which are meshed with drive wheel teeth 21eb formed on an outer periphery of drive wheel 21. A tooth groove 21ea is formed between drive wheel teeth 21eb disposed adjacently to each other in the circumferential direction. When projection portions 2b are meshed with drive wheel teeth 21eb, projection portions 2b are fitted in tooth grooves 21ea.

Due to meshing of the above-mentioned projection portions 2b and tooth grooves 21ea, a rotational driving force of drive wheel 21 is transmitted to track apparatus 10 so that track apparatus 10 is rotatably driven.

Figure 3:
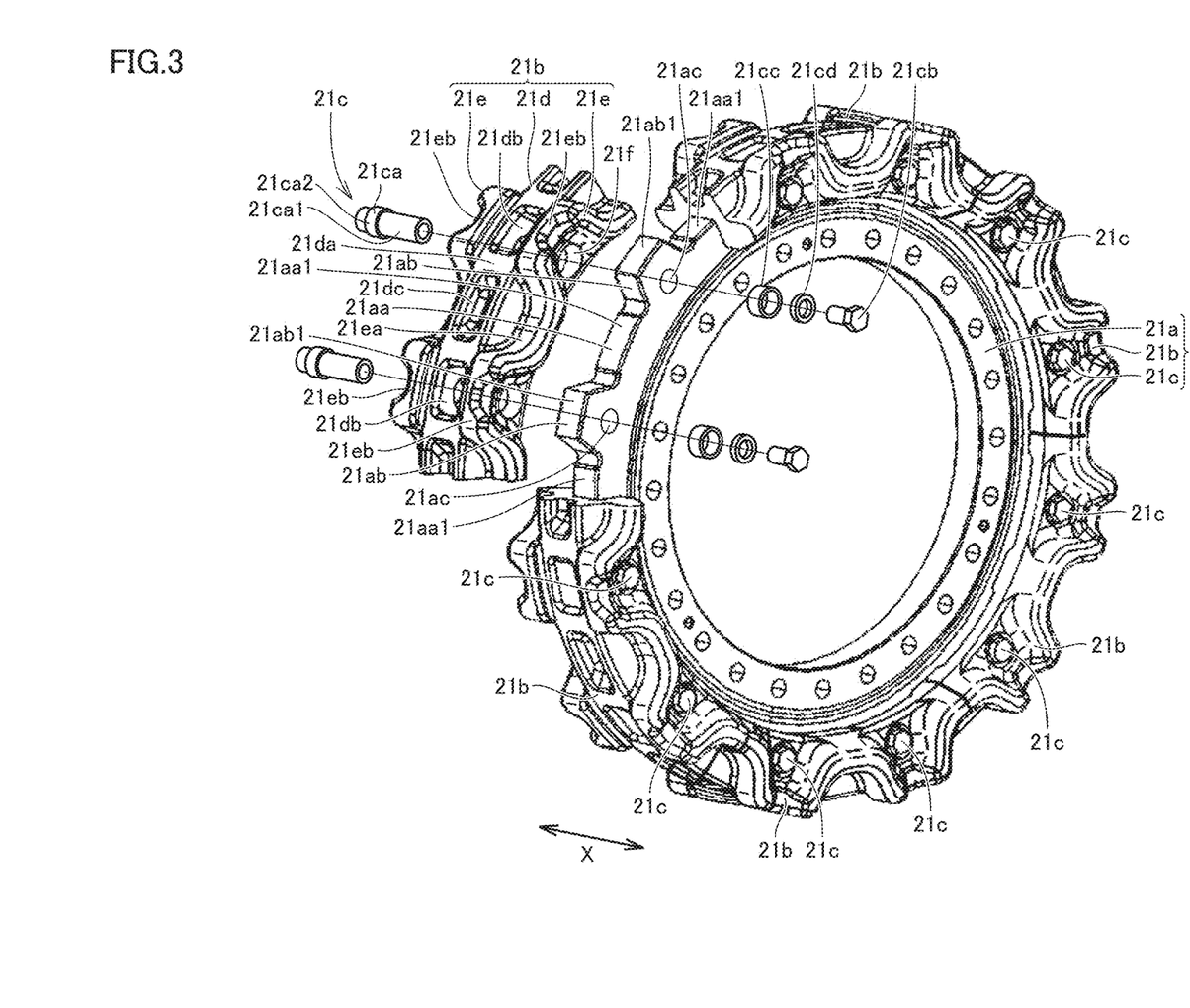
FIG. 3 is an exploded perspective view showing a configuration of a drive wheel of the traveling unit in FIG. 2.
Figure 4:
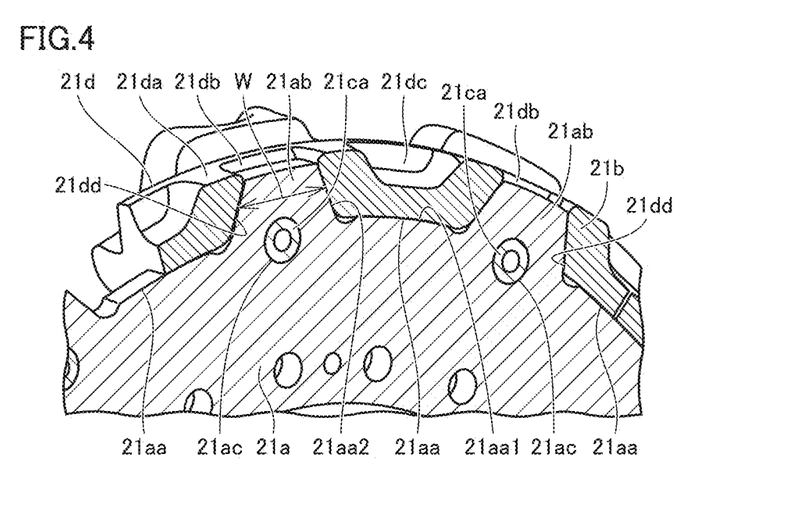
FIG. 4 is a cross-sectional perspective view of the drive wheel of the traveling unit in FIG. 2 in a direction perpendicular to a rotary shaft.

Next, with reference to FIGS. 3 and 4, a configuration of drive wheel 21 in traveling unit 20 of this embodiment is described.

FIG. 3 is an exploded perspective view showing a configuration of the drive wheel of the traveling unit in FIG. 2, and FIG. 4 is a cross-sectional perspective view of the drive wheel in a direction parallel to a rotary shaft of the drive wheel.

As shown in FIG. 3, drive wheel 21 is formed of a drive wheel body 21a, drive wheel segments 21b, and fixtures 21c. Drive wheel body 21a and drive wheel segments 21b are parts separate from each other. Each of drive wheel segments 21b is mounted on drive wheel body 21a by fixtures 21c.

Drive wheel body 21a has an annular shape, for example. A plurality of protrusions 21ab and a plurality of recessed portions 21aa are formed on an outer peripheral portion of annular drive wheel body 21a. The plurality of protrusions 21ab and the plurality of recessed portions 21aa are formed such that protrusion 21ab and recessed portion 21aa are positioned alternately in the circumferential direction. Protrusion 21ab and recessed portion 21aa are disposed adjacently to each other.

Each of the plurality of protrusions 21ab projects toward an outer peripheral side of drive wheel body 21a more than a bottom portion 21aa1 of recessed portion 21aa. On the other hand, each of the plurality of recessed portions 21aa is indented toward an inner peripheral side of drive wheel body 21a more than a peak portion 21ab1 of the protrusion.

Through holes 21ac which penetrate drive wheel body 21a are formed in drive wheel body 21a. These through holes 21ac penetrate drive wheel body 21a in an axial direction (in an X direction in the drawing) of drive wheel body 21a. Each through hole 21ac is positioned on an inner peripheral side (inner peripheral side of peak portion 21ab1) of protrusion 21ab.

Drive wheel segments 21b are disposed on an outer periphery of drive wheel body 21a. Each drive wheel segment 21b includes a pair of end portions 21e, and a center portion 21d. Center portion 21d is sandwiched between the pair of end portions 21e in a width direction (in the X direction in the drawing) of drive wheel 21.

Each of the pair of end portions 21e includes the plurality of tooth grooves 21ea and the plurality of drive wheel teeth 21eb. The plurality of drive wheel teeth 21eb and the plurality of tooth grooves 21ea are formed such that drive wheel tooth 21eb and tooth groove 21ea are positioned alternately in a circumferential direction. Drive wheel tooth 21eb and tooth groove 21ea are disposed adjacently to each other.

Each of the plurality of drive wheel teeth 21eb projects toward an outer peripheral side of drive wheel body 21a more than a bottom portion of tooth groove 21ea. On the other hand, each of the plurality of tooth grooves 21ea is indented toward an inner peripheral side of drive wheel body 21a more than a peak portion of drive wheel tooth 21eb.

Center portion 21d is positioned in a teeth width direction of drive wheel teeth 21eb (a width direction: the X direction in the drawing). A center outer peripheral surface 21da extending along the circumference is formed on center portion 21d. On center outer peripheral surface 21da, openings 21db and outer surface indented portions 21dc are formed.

As shown in FIG. 4, outer surface indented portion 21dc is a portion indented toward an inner peripheral side from center outer peripheral surface 21da. Outer surface indented portion 21dc does not penetrate drive wheel segment 21b in a radial direction and has a bottom.

On center portion 21d, inner surface indented portions 21dd which extend from an inner peripheral surface of drive wheel segment 21b toward a center outer peripheral surface 21da side are formed. A width W of inner surface indented portion 21dd in a circumferential direction is gradually decreased from an inner peripheral side toward an outer peripheral side.

Inner surface indented portion 21dd is communicated with opening 21db described above. With such a configuration, inner surface indented portion 21dd opens at center outer peripheral surface 21da of center portion 21d, and penetrates drive wheel segment 21b from an inner peripheral side to an outer peripheral side.

As shown in FIG. 3, through holes 21f are formed in drive wheel segment 21b. Through holes 21f penetrate drive wheel segment 21b in a tooth width direction (in a width direction: in the X direction in the drawing) of drive wheel tooth 21eb. Through hole 21f is not formed in a portion corresponding to tooth groove 21ea but is formed in a portion corresponding to drive wheel tooth 21eb.

Fixtures 21c fix drive wheel segment 21b to drive wheel body 21a. Each fixture 21c includes a fixing pin 21ca, a bolt 21cb, a cylindrical member 21cc, and an annular member 21cd.

Fixing pin 21ca has a small-diameter portion 21ca1 and a large-diameter portion 21ca2. Large-diameter portion 21ca2 has an outer diameter larger than an outer diameter of small-diameter portion 21ca1. Large-diameter portion 21ca2 is formed on one end side of small-diameter portion 21ca1. Large-diameter portion 21ca2 projects in a flange shape on an outer peripheral side of small-diameter portion 21ca1. Small-diameter portion 21ca1 has a female threaded portion on the other end thereof.

An outer diameter of small-diameter portion 21ca1 is set smaller than a diameter of through hole 21ac of drive wheel body 21a. On the other hand, an outer diameter of large-diameter portion 21ca2 is set larger than the diameter of through hole 21ac formed in drive wheel body 21a. Further, the outer diameter of large-diameter portion 21ca2 is set smaller than a diameter of through hole 21f formed in drive wheel segment 21b.

Bolt 21cb has a male threaded portion. The male threaded portion of bolt 21cb is threadedly engageable with the female threaded portion of fixing pin 21ca. A maximum diameter of a head portion of bolt 21cb is set smaller than the diameter of through hole 21f formed in drive wheel segment 21b.

Cylindrical member 21cc has an inner diameter larger than an outer diameter of small-diameter portion 21ca1 of fixing pin 21ca. Accordingly, small-diameter portion 21ca1 of fixing pin 21ca can be made to pass through cylindrical member 21cc.

An outer diameter of cylindrical member 21cc is set larger than the diameter of through hole 21ac formed in drive wheel body 21a. An outer diameter of cylindrical member 21cc is set smaller than the diameter of through hole 21f formed in drive wheel segment 21b.

An inner diameter of annular member 21cd is set smaller than the outer diameter of small-diameter portion 21ca1 of fixing pin 21ca and larger than a nominal diameter of the male threaded portion of bolt 21cb. An outer diameter of annular member 21cd is set larger than the inner diameter of cylindrical member 21cc. An outer diameter of annular member 21cd is set smaller than the diameter of through hole 21f formed in drive wheel segment 21b.

Figure 5:
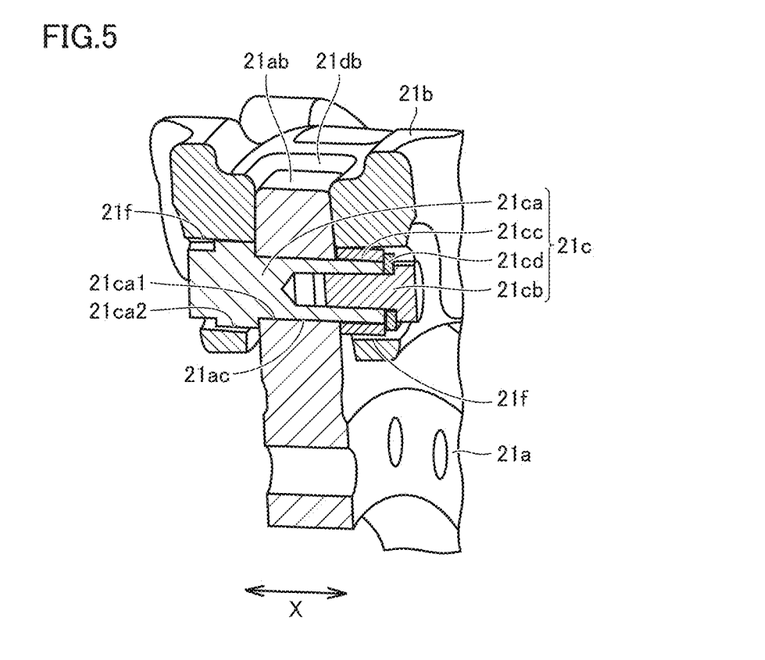
FIG. 5 is a cross-sectional perspective view of the drive wheel of the traveling unit in FIG. 2 in a direction parallel to the rotary shaft.
Figure 6:
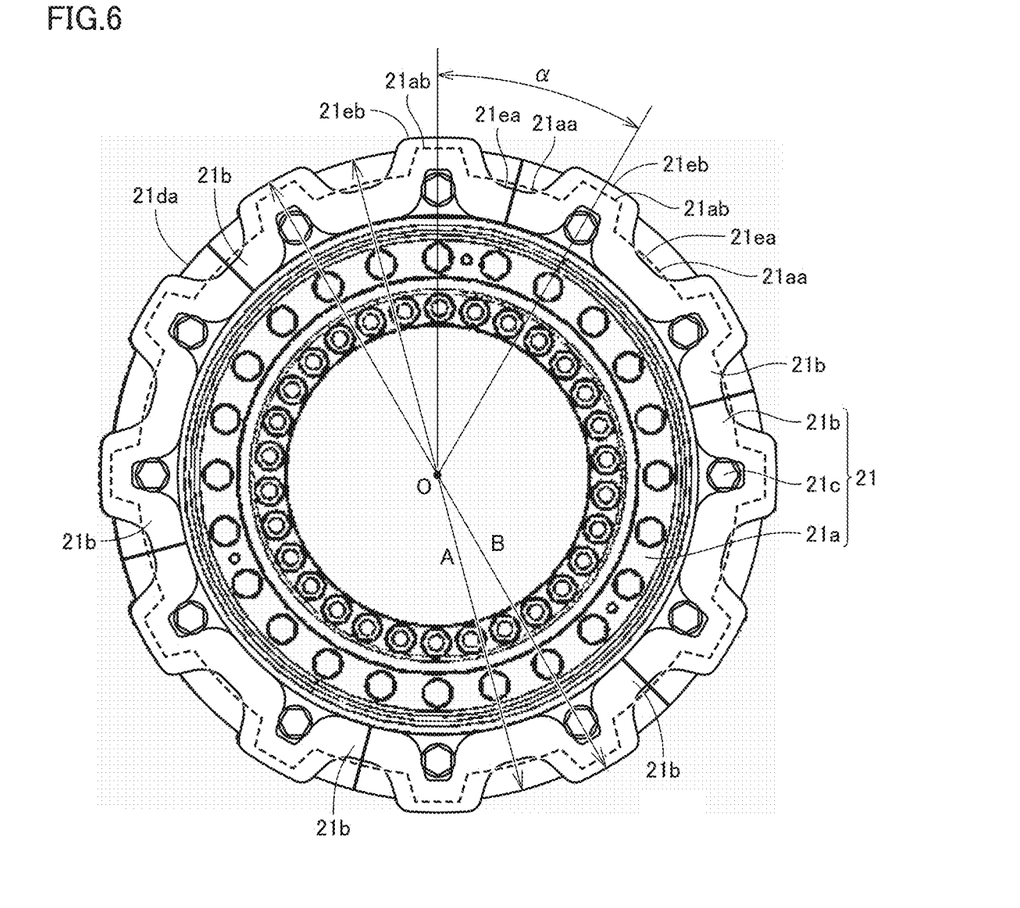
FIG. 6 is a side view of the drive wheel of the traveling unit in FIG. 2 for describing a state where a plurality of protrusions of a drive wheel body are made to overlap with a plurality of drive wheel teeth respectively as viewed in a side view.

Next, with reference to FIGS. 4 to 6, an assembled state of drive wheel segment 21b to the above-mentioned drive wheel body 21a is described.

FIG. 5 is a cross-sectional perspective view of the drive wheel of the traveling unit shown in FIG. 2 in a direction parallel to the rotary shaft of the drive wheel. FIG. 6 is a side view of the drive wheel for describing a state where the plurality of protrusions of the drive wheel body are made to overlap with the plurality of drive wheel teeth respectively as viewed in a side view.

As shown in FIG. 4, the plurality of drive wheel segments 21b are mounted on the outer peripheral portion of drive wheel body 21*a*. In such a mounting state, protrusions 21*ab* of drive wheel body 21*a* are received in inner surface indented portions 21*dd* of drive wheel segments 21*b*.

In the above-mentioned mounting state, drive wheel segments 21*b* are brought into contact with both bottom portions 21*aa*1 and side surfaces 21*aa*2 of recessed portions 21*aa* of drive wheel body 21*a*. The peak portions of protrusions 21*ab* are exposed from drive wheel segments 21*b* through openings 21*db* respectively.

As shown in FIG. 5, in the above-mentioned mounting state, through hole 21*ac* of drive wheel body 21*a* and through hole 21*f* of drive wheel segment 21*b* are arranged substantially concentrically with each other. Fixture 21*c* is inserted into through hole 21*ac* and through hole 21*f* Due to fixtures 21*c*, drive wheel segment 21*b* and drive wheel body 21*a* are fixed to each other.

Small-diameter portion 21*ca*1 of fixing pin 21*ca* passes through the inside of through hole 21*ac*, and extends to the inside of through hole 21*f* positioned on one side of through hole 21*ac*. On the other hand, large-diameter portion 21*ca*2 is positioned in the inside of through hole 21*f* formed in the other side of through hole 21*ac*.

Cylindrical member 21*cc* is fitted on an outer periphery of small-diameter portion 21*ca*1 projecting from through hole 21*ac*. Annular member 21*cd* is disposed on an end portion of small-diameter portion 21*ca*1 projecting from through hole 21*ac*. The male threaded portion of bolt 21*cb* passes through annular member 21*cd*, and is threadedly engaged with female threaded portion of small-diameter portion 21*ca*1. With such a configuration, annular member 21*cd* is sandwiched between the end portion of small-diameter portion 21*ca*1 and a head portion of bolt 21*cb*. The removal of cylindrical member 21*cc* from small-diameter portion 21*ca*1 is prevented by annular member 21*cd*.

By sandwiching through hole 21*ac* between large-diameter portion 21*ca*2 and cylindrical member 21*cc*, fixtures 21*c* are fixed to drive wheel body 21*a* so as not to be removed from drive wheel body 21*a*. Further, cylindrical member 21*cc* and the like are positioned in the inside of through hole 2*f* on one side of through hole 21*ac*, and large-diameter portion 21*ca*2 is positioned in the inside of through hole 2*f* on the other side of through hole 21*ac*. With such a configuration, drive wheel segment 21*b* is fixed to drive wheel body 21*a* so as not to be removed from drive wheel body 21*a*.

As shown in FIG. 6, in the above-mentioned mounting state, the plurality of protrusions 21*ab* of drive wheel body 21*a* are arranged in an overlapping manner with the plurality of drive wheel teeth 21*eb* of drive wheel segments 21*b* as viewed in a side view respectively.

More specifically, the plurality of protrusions 21*ab* are arranged at the same angular positions as the plurality of drive wheel teeth 21*eb* are arranged in a radial direction as viewed from a center O of drive wheel 21 respectively. Further, an angular pitch α of the plurality of protrusions 21*ab* and an angular pitch α of the plurality of drive wheel teeth 21*eb* are set equal to each other.

A diameter A (or a radius) of center outer peripheral surfaces 21*da* of center portions 21*d* is set lower than or equal to a diameter B (or a radius) of drive wheel teeth 21*eb* over the entire circumference. In this embodiment, diameter A (or the radius) of center outer peripheral surfaces 21*da* is set smaller than diameter B (or the radius) of drive wheel teeth 21*eb* over the entire circumference.

Figure 7:
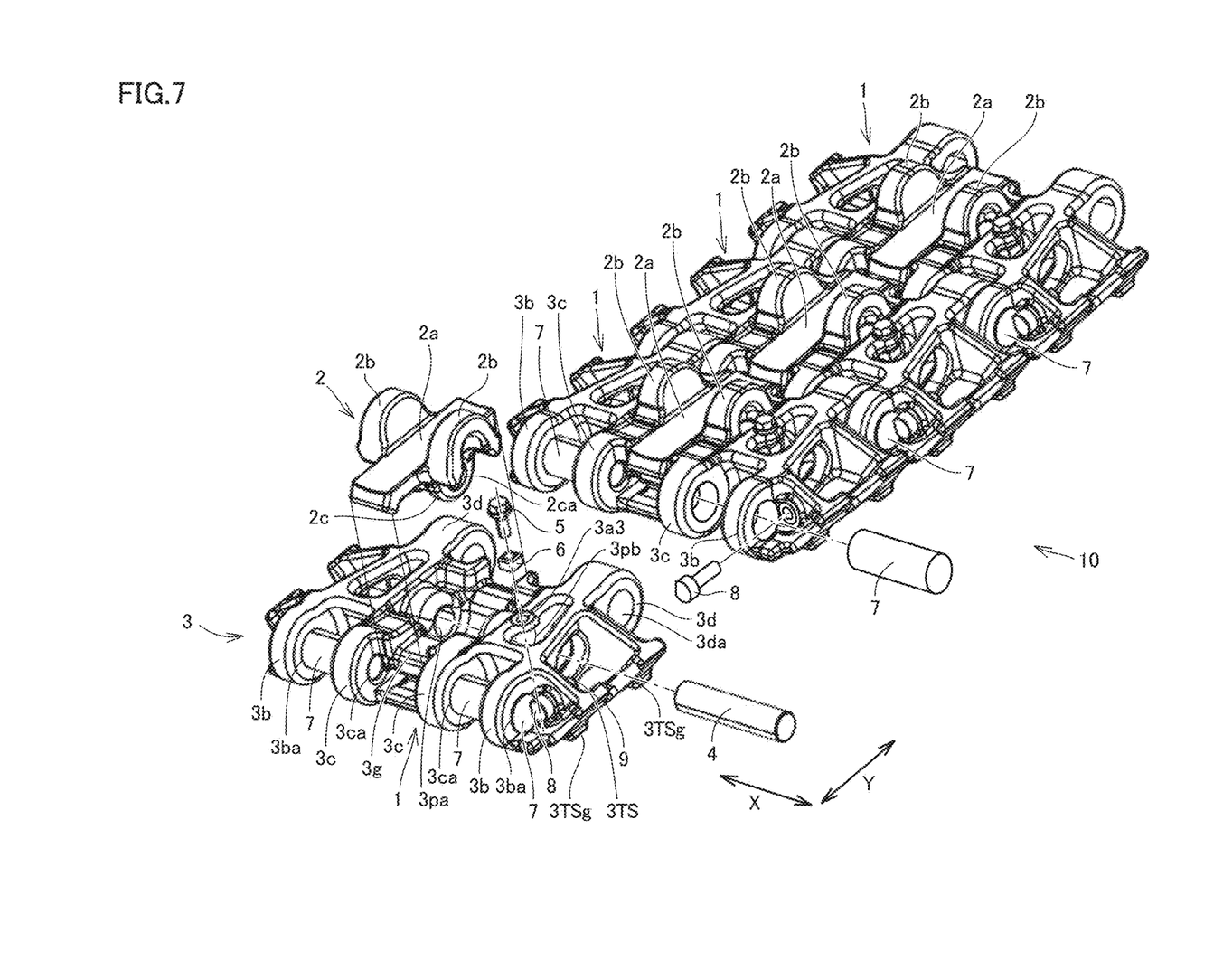
FIG. 7 is an exploded perspective view schematically showing a portion of a configuration of a track apparatus included in the traveling unit in FIG. 2.

Next, with reference to FIG. 7, a configuration of track apparatus 10 of this embodiment is described.

FIG. 7 is an exploded perspective view schematically showing a part of the configuration of the track apparatus included in the traveling unit in FIG. 2. As shown in FIG. 7, the above-mentioned track apparatus 10 mainly includes the plurality of track links 1, and connecting pins 7 for connecting the plurality of track links 1 to each other.

Each of the plurality of track links 1 includes rail surface 2*a* and projection portions 2*b* as abraded portions. In this embodiment, these abraded portions (rail surface 2*a* and projection portions 2*b*) are detachably mounted on track link 1. Hereinafter, such a configuration is described in detail.

Each of the plurality of track links 1 mainly includes a link mounted part 2, a link body 3, and a mounting pin 4. Link mounted part 2 includes abraded portions formed of rail surface 2*a* and projection portions 2*b*. Rail surface 2*a* is positioned in a width direction of projection portions 2*b*. Link mounted part 2 further includes a mount element 2*c*. A through hole 2*ca* is formed in mount element 2*c*.

Link body 3 is formed as a part separate from link mounted part 2. Link body 3 is a part where a track shoe plate portion 3TS and a link portion are integrally formed with each other, and is formed of a single part. Track shoe plate portion 3TS is positioned on an outer surface (ground engaging surface) of endless track apparatus 10. Track shoe plate portion 3TS includes a grouser 3TSg projecting to the outside of track apparatus 10.

Link body 3 includes a recessed portion 3*g* on an inner surface (non ground-engaging surface) of track apparatus 10. Here, the non ground-engaging surface means a surface disposed on a side opposite to a side where track shoe plate portion 3TS is disposed, that is, the non ground-engaging surface is a surface disposed on a side where track apparatus 10 is brought into contact with drive wheel 21, idler wheel 22, track rollers 24, and carrier rollers 25 as shown in FIGS. 1 and 2. Recessed portion 3*g* is provided for fitting link mounted part 2. A through hole 3*pa* (second pin inserting hole) and a through hole 3*pb* are formed so as to be communicated with recessed portion 3*g*. Through hole 3*pa* and through hole 3*pb* are separated from each other with recessed portion 3*g* sandwiched therebetween. Through hole 3*pa* and through hole 3*pb* are formed coaxially with each other.

Link mounted part 2 is fitted in recessed portion 3*g* of link body 3 from a non-contact surface side. Link mounted part 2 is fitted in recessed portion 3*g* of link body 3 from mount element 2*c* side. In a state where link mounted part 2 is fitted in recessed portion 3*g* of link body 3, through hole 2*ca* formed in mount element 2*c* is positioned between through hole 3*pa* and through hole 3*pb* of link body 3. Through hole 3*pa*, through hole 3*pb*, and through hole 2*ca* are respectively arranged coaxially with each other, and are communicated with each other.

Mounting pin 4 is inserted into these through holes 3*pa*, 3*pb*, and 2*ca* in an axial direction of mounting pin 4. Due to such mounting pin 4, link mounted part 2 is mounted and fixed to link body 3 on a side opposite to projection portions 2*b* with respect to the above-mentioned plate portion.

To prevent the removal of mounting pin 4, restriction members (for example, a bolt 5 and a nut 6) are used. The insertion of mounting pin 4 is performed by inserting mounting pin 4 into the inside of through holes 3*pa*, 3*pb*, 2*ca* in an axial direction of mounting pin 4. Restriction members 5, 6 are positioned in the axial direction of mounting pin 4 in a state where restriction members 5, 6 are mounted on link body 3. The axial movement of mounting pin 4 is restricted by restriction members 5, 6. With such a configuration, the removal of mounting pin 4 from through holes 3*pa*, 3*pb*, and 2*ca* in the axial direction can be prevented in a state where mounting pin 4 is made to pass through holes 3*pa*, 3*pb*, and 2*ca*.

Bolt 5 is inserted into through hole 3*a*3 formed in link body 3 from a non-contact surface side. Nut 6 is threadedly engaged with a distal end of bolt 5 projecting from through hole 3*a*3 toward a contact surface side. With such a configuration, bolt 5 and nut 6 are fixed to link body 3.

By inserting and removing above-mentioned mounting pin 4, link mounted part 2 having the abraded portions (rail surface 2*a* and projection portions 2*b*) can be mounted on and dismounted from link body 3. Further, mounting and dismounting of above-mentioned link mounted part 2 on and from link body 3 can be performed without releasing connection between track links 1 which form track apparatus 10.

Track links 1 are configured to be connected with each other by connecting pin 7. Hereinafter, such a configuration is described in detail.

The plurality of track links 1 are arranged in a row. Two sets each of which is formed of a pair of connecting portions 3*b*, 3*c* are formed on each one of the plurality of track links 1 on one end side of track link 1 in a lateral direction (in a Y direction in the drawing), for example. A through hole 3*ba* is formed in connecting portion 3*b*. A through hole 3*ca* is formed in connecting portion 3*c*. Through hole 3*ba* and through hole 3*ca* formed in the pair of connecting portions 3*b*, 3*c* extend in a longitudinal direction (in an X direction in the drawing) of track link 1, and are arranged coaxially with each other.

Each one of the plurality of track links 1 is provided with, for example, two connecting portions 3*d* on the other end side of track link 1 in the lateral direction Y. A through hole 3*da* is formed in connecting portion 3*d*. Through holes 3*da* extend in the longitudinal direction X of track link 1.

Connecting portion 3*d* of the other track link 1 is disposed between one pair of connecting portions 3*b*, 3*c* of one track link 1. In a state where connecting portion 3*d* is disposed between the pair of connecting portions 3*b*, 3*c*, through hole 3*da* of connecting portion 3*d* is positioned between respective through holes 3*ba*, 3*ca* of one pair of connecting portions 3*b*, 3*c*. Respective through holes 3*ba*, 3*ca* of connecting portions 3*b*, 3*c* and through hole 3*da* of connecting portion 3*d* are arranged coaxially with each other, and are communicated with each other.

Connecting pin 7 is made to pass through these through holes 3*ba*, 3*ca*, and 3*da* in an axial direction of connecting pin 7. With such a configuration, one track link 1 and the other track link 1 are connected with each other by connecting pin 7. In such a connection state, one track link 1 and the other track link 1 are rotatable relative to each other about connecting pin 7.

To prevent the removal of connecting pin 7, restriction members (for example, a bolt 8 and a nut 9) are used. Restriction members 8, 9 are positioned in the axial direction of connecting pin 7 in a state where restriction members 8, 9 are mounted on link body 3. Due to restriction members 8, 9, the axial movement of connecting pin 7 is restricted. With such a configuration, the removal of connecting pin 7 from through holes 3*ba*, 3*ca*, and 3*da* in the axial direction of the connecting pin 7 can be prevented in a state where connecting pin 7 is made to pass through holes 3*ba*, 3*ca*, and 3*da*.

By sequentially connecting the plurality of track links 1 to each other as described above, track links 1 can be connected to each other in an endless manner.

Further, by removing the above-mentioned restriction members 8, 9 from link body 3 and by removing connecting pin 7 from connecting portions 3*b* to 3*d*, the connection between track links 1 can be released.

Figure 8:
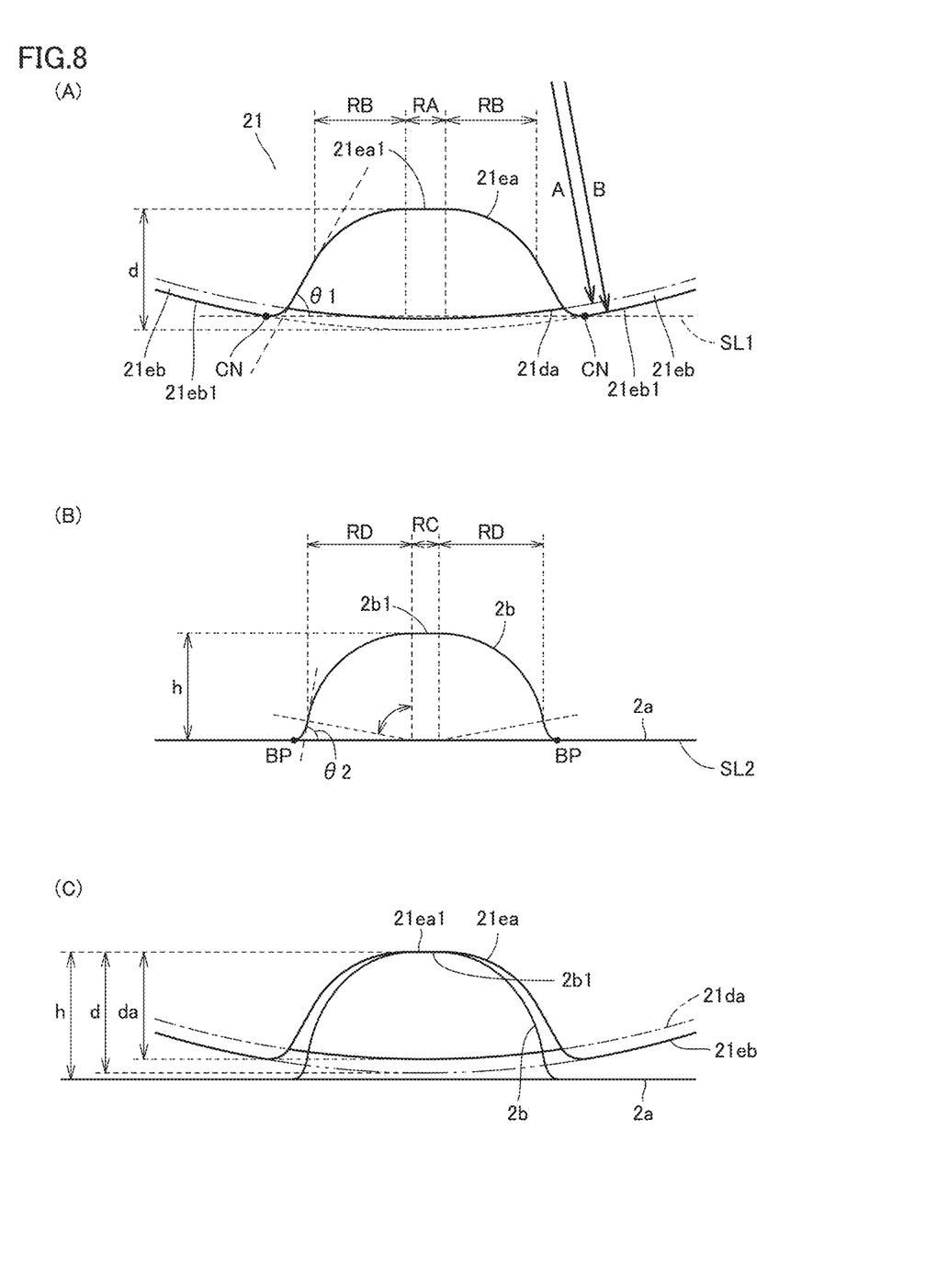
FIG. 8(A) is a side view for describing a configuration of a tooth groove of the drive wheel.
FIG. 8(B) is a side view for describing a configuration of a projection portion of a track link.
FIG. 8(C) is a side view for describing the configuration of the tooth groove of the drive wheel and the projection portion of the track link.
Figure 9:
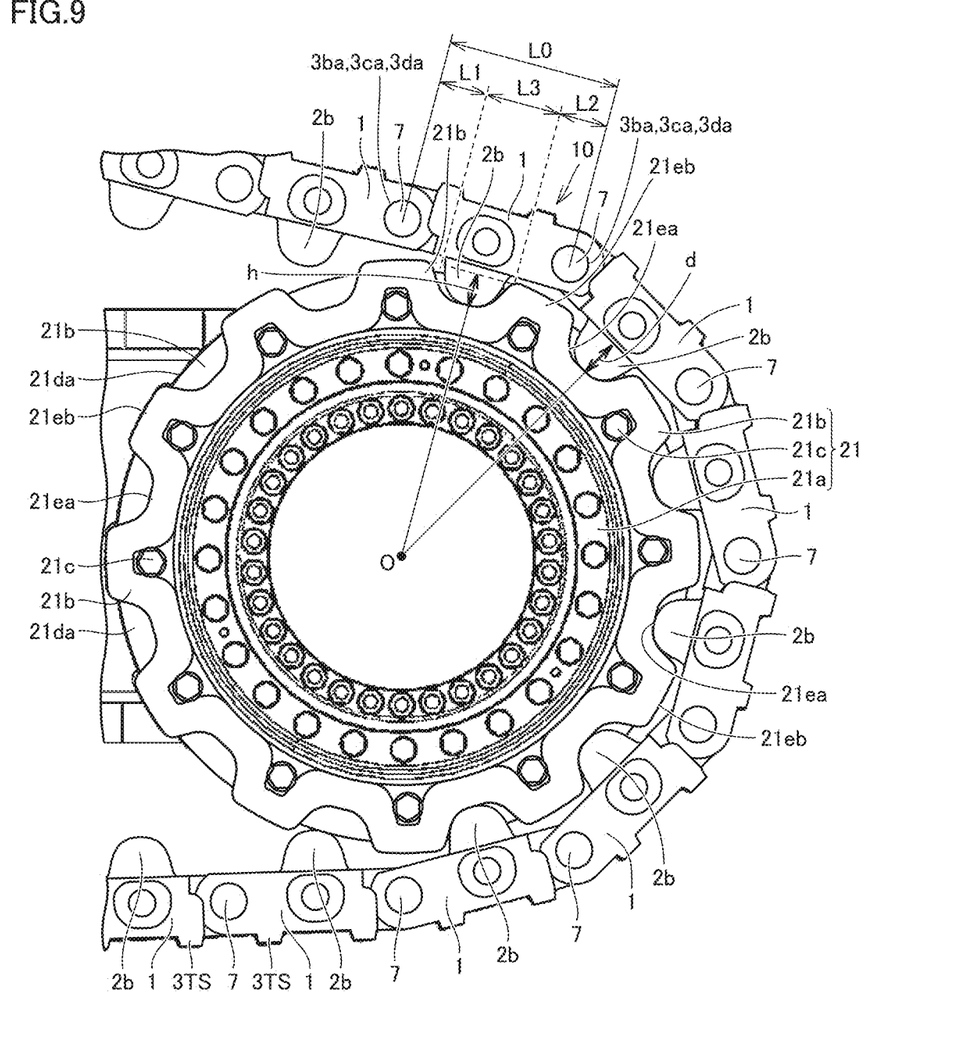
FIG. 9 is a side view schematically showing a configuration of the drive wheel and the track apparatus in the traveling unit in FIG. 2.

Next, with reference to FIGS. 8 and 9, the description is made with respect to a shape of tooth groove 21*ea* of drive wheel 21 and a shape of projection portion 2*b* of track link 1 in traveling unit 20 of this embodiment.

FIG. 8(A) is a side view for describing a configuration of the tooth groove of the drive wheel, FIG. 8(B) is a side view for describing a configuration of the projection portion of the track link, and FIG. 8(C) is a side view for describing the configuration of the tooth groove of the drive wheel and the projection portion of the track link.

As shown in FIG. 8(A), drive wheel 21 includes the plurality of drive wheel teeth 21*eb* and the plurality of tooth grooves 21*ea* on the outer peripheral portion thereof. Drive wheel tooth 21*eb* and tooth groove 21*ea* are disposed adjacently to each other in the circumferential direction.

Tooth groove 21*ea* has a straight line portion RA positioned at bottom portion 21*ea*1 and two arcuate portions RB positioned at both sides of straight line portion RA as viewed in a side view. An end portion of arcuate portion RB and peak portion 21*eb*1 of drive wheel tooth 21*eb* are continued to each other by a smooth curve. A boundary between the smooth curve and peak portion 21*eb*1 forms a groove end portion CN of tooth groove 21*ea*.

As shown in FIG. 8(B), projection portion 2*b* of track link 1 has a straight line portion RC positioned at a peak portion 2*b*1 and two arcuate portions RD positioned on both sides of straight line portion RC as viewed in a side view. An end portion of arcuate portion RD and a flat surface of track link 1 are continued by a smooth curve. A boundary between the smooth curve and the flat surface of track link 1 forms a root portion BP of projection portion 2*b*.

As shown in FIGS. 8(A) and 8(B), as viewed in a side view, an angle θ1 of arcuate portion RB rising from a groove end portion CN side toward a bottom portion 21*ea*1 side with respect to a first imaginary straight line SL1 which connects groove end portions CN on both sides of tooth groove 21*ea* to each other is set smaller than an angle θ2 of arcuate portion RD rising from a root portion BP side toward a peak portion 2*b*1 side with respect to a second imaginary straight line SL2 which connects root portions BP on both sides of projection portion 2*b* to each other.

As shown in FIG. 8(C), projection portion 2*b* has a height h greater than or equal to a depth d of tooth groove 21*ea*. In this embodiment, height h of projection portion 2*b* is set larger than depth d of tooth groove 21*ea*.

Depth d of tooth groove 21*ea* is a size from bottom portion 21*ea*1 of tooth groove 21*ea* to a tooth tip circle of drive wheel teeth 21*eb*. Accordingly, depth d of tooth groove 21*ea* is a size obtained by subtracting a diameter of a tooth bottom circle from a tooth tip circle diameter, and is equal to a tooth height of drive wheel tooth 21*eb*. Further, height h of projection portion 2*b* is a maximum size from rail surface 2*a* of track link 1 in a direction perpendicular to rail surface 2*a*.

As described above, height h of projection portion 2*b* is larger than depth d of tooth groove and hence, in a state where projection portion 2*b* is meshed with drive wheel tooth 21*eb*, peak portion 2*b*1 of projection portion 2*b* is brought into contact with bottom portion 21*ea*1 of tooth groove 21*ea*.

Further, as shown in FIG. 6, a diameter A of center outer peripheral surface 21*da* of drive wheel segment 21*b* is set less than or equal to a diameter (the tooth tip circle diameter) B of drive wheel teeth 21*eb* over the entire circumference. Accordingly, due to the above-mentioned relationship between height h of projection portion 2b and depth d of tooth groove, as shown in FIG. 8(C), rail surface 2a of track link 1 is not brought into contact with center outer peripheral surface 21da of drive wheel 21 at the time of meshing. In such a state, a gap is formed between rail surface 2a of track link 1 and center outer peripheral surface 21da of drive wheel 21. A size of the gap is a size obtained by subtracting a height da of center outer peripheral surface 21da of drive wheel 21 from height h of the projection portion. In this embodiment, height da of center outer peripheral surface 21da is a size of drive wheel 21 in a radial direction from bottom portion 21ea1 of tooth groove 21ea to center outer peripheral surface 21da as viewed in a side view.

As described above, as shown in FIG. 9, all projection portions 2b which are meshed with drive wheel teeth 21eb are brought into contact with bottom portions of tooth grooves 21ea. Further, in the above-mentioned meshing state, rail surface 2a of track link 1 and center outer peripheral surface 21da of drive wheel 21 are not brought into contact with each other, and the gap is formed between rail surface 2a and center outer peripheral surface 21da.

Further, projection portion 2b of track link 1 is disposed at the center between first link connection holes (through holes 3ba, 3ca) and a second link connection hole (through hole 3da) as viewed in a side view. More specifically, projection portion 2b is disposed such that a distance L1 from the center of the first link connection holes (through holes 3ba, 3ca) to one end portion of projection portion 2b and a distance L2 from the center of the second link connection hole (through hole 3da) to the other end portion of projection portion 2b become equal to each other.

It is preferable that each of drive wheel segments 21b shown in FIG. 3 and link mounted part 2 shown in FIG. 7 be a forged product formed by forging. The work vehicle of this embodiment is a large-sized vehicle and hence, usually, each of the track link and the drive wheel is formed of a casting produced by foundry.

However, in this embodiment, drive wheel segments 21b are parts separate from drive wheel body 21a and hence, drive wheel segments 21b can be prepared as small parts. Further, link mounted part 2 is also a part separate from link body 3 and hence, link mounted part 2 can be prepared as a small part. In this manner, each of drive wheel segment 21b and link mounted part 2 can be prepared as a small part and hence, each of drive wheel segment 21b and link mounted part 2 can be prepared as forgings.

Since drive wheel segment 21b and link mounted part 2 can be prepared as forgings, an accuracy in shape can be enhanced compared to a case where these members are prepared as castings. Accordingly, meshing accuracy between projection portions 2b and drive wheel teeth 21eb can be also enhanced.

In the above-mentioned description, the description has been made with respect to the configuration of track link 1 where link body 3 and link mounted part 2 are formed as parts separate from each other. However, track link 1 may have a configuration where a link body and a link mounted part may be formed as portions of the same integral part.

Figure 10:
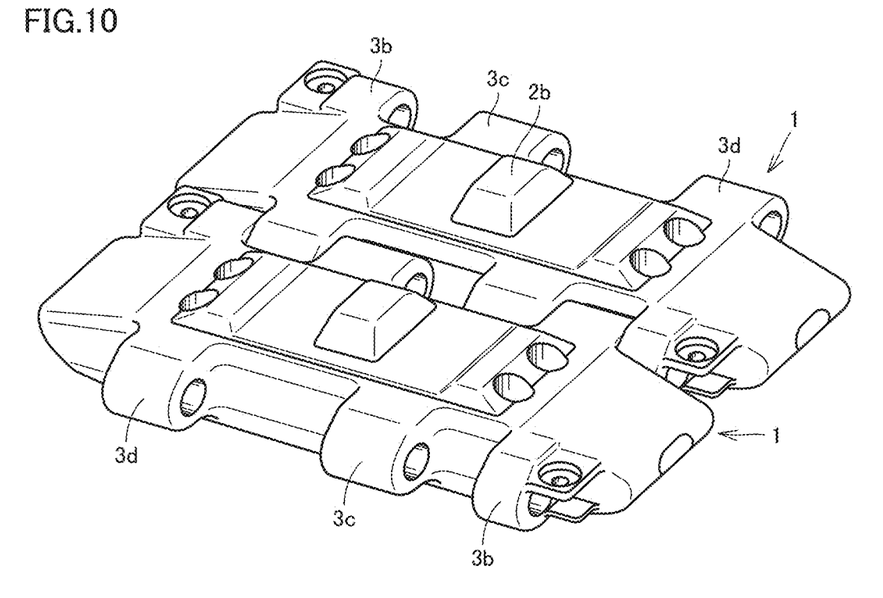
FIG. 10 is a perspective view schematically showing a portion of another configuration of the track apparatus included in the traveling unit in FIG. 2.
Figure 11:
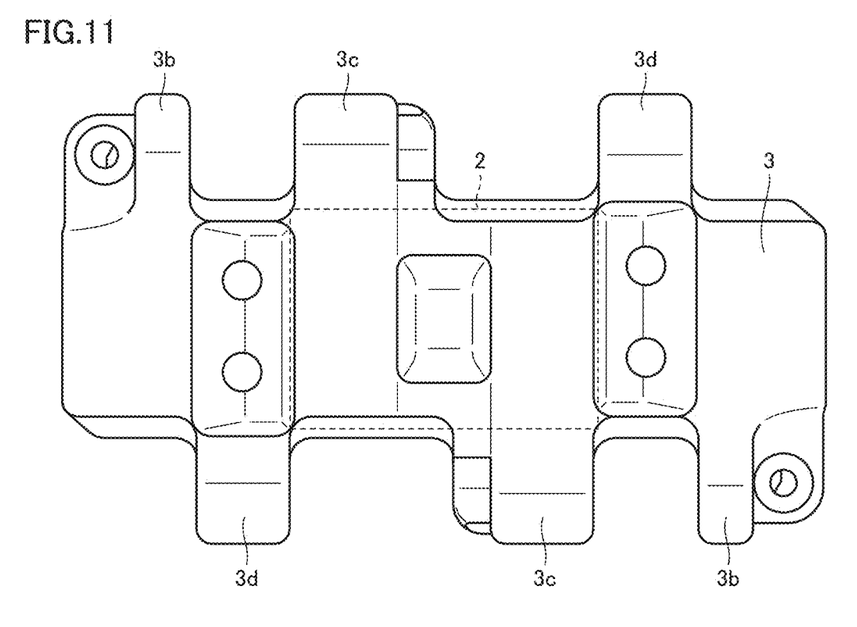
FIG. 11 is a plan view schematically showing the configuration of the track link of the track apparatus in FIG. 10.

FIG. 10 is a perspective view schematically showing a portion of other configuration of the track apparatus included in the traveling unit in FIG. 2, and FIG. 11 is a plan view schematically showing the configuration of the track link. As shown in FIGS. 10 and 11, track link 1 has the configuration where a link body portion having connecting portions 3b, 3c, 3d and a link mounted part having projection portions 2b are integrally formed with each other.

Connecting portions 3b, 3c, 3d are portions used for connecting track links 1 to each other. Projection portions 2b are portions meshed with drive wheel teeth of a drive wheel.

In this track link 1, connecting portion 3d of one track link 1 out of a pair of track links 1 is inserted in between connecting portions 3b, 3c of the other of track link 1. In such a state, one connecting pin is inserted into respective through holes of three connecting portions 3b, 3c, 3d.

Further, connecting portion 3d of the other track link 1 is inserted between connecting portions 3b, 3c of one track link 1. In such a state, one connecting pin is inserted into respective through holes of three connecting portions 3b, 3c, 3d.

The pair of track links 1 are connected to each other as has been described above, and a track apparatus is assembled by repeating such a connection.

In FIGS. 10 and 11, the description has been made with respect to the configuration where one projection portion 2b is provided to one track link 1. However, two projection portions may be provided to track link 1 in conformity with drive wheel 21 shown in FIGS. 2, 3 and the like.

Figure 12:
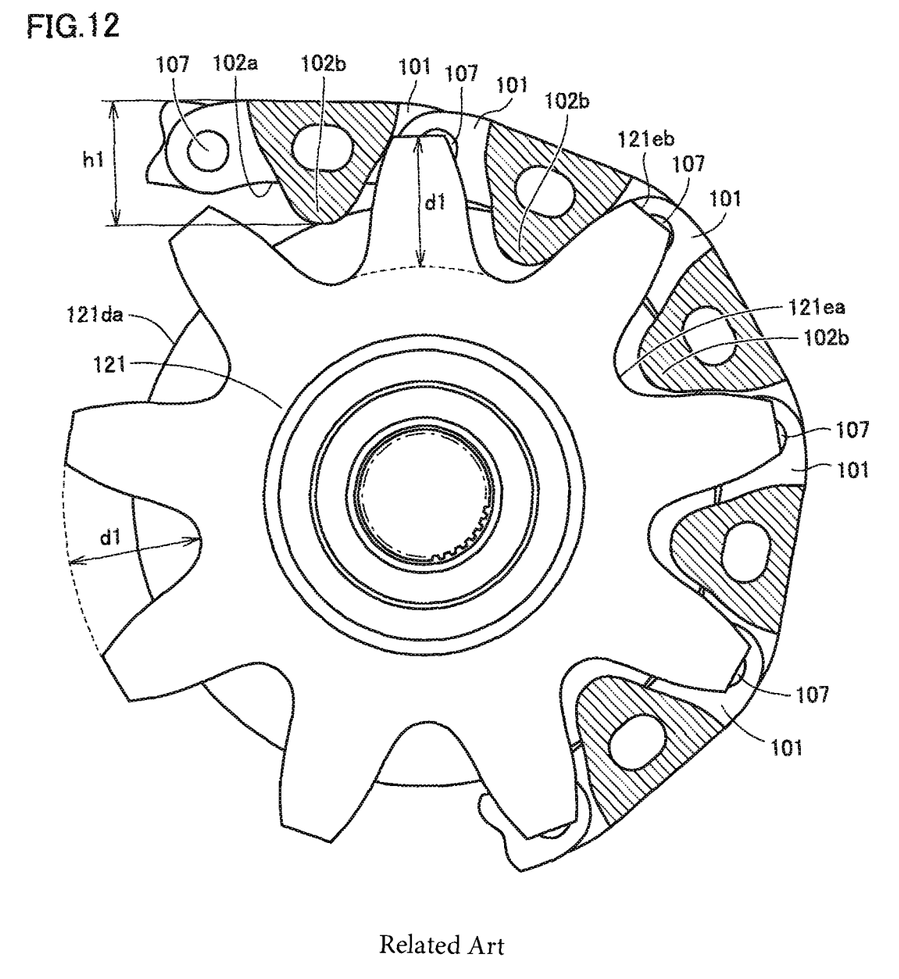
FIG. 12 is a side view for describing a meshing state between drive wheel teeth and projection portions of a track link in a traveling unit according to a comparison example.

Next, the manner of operation and advantageous effects of this embodiment are described in comparison with those of a comparison example shown in FIG. 12.

FIG. 12 is a side view for describing a meshing state between drive wheel teeth and projection portions of a track link in a traveling unit according to the comparison example. As shown in FIG. 12, in this comparison example, a height h1 of a projection portion 102b of a track link 101 is set smaller than a depth d1 of a tooth groove 121ea of a drive wheel 121. Depth d1 of tooth groove 121ea is set equal to a tooth height d1 of drive wheel tooth 121eb.

When projection portions 102b of track link 101 are meshed with drive wheel teeth 121eb of drive wheel 121, a rolling surface 121da of drive wheel 121 is brought into contact with a rail surface 102a of track link 101.

In this case, a winding diameter of track link 101 with respect to drive wheel 121 depends on either one of (a) a contact between rail surface 102a of track link 101 and rolling surface 121da of drive wheel 121 and (b) a relationship between a connection pitch of track links 101 (a distance between connecting pins 107) and a pitch of drive wheel teeth 121eb. Accordingly, a meshing pitch is displaced due to the difference in abrasion speeds between the respective parts. As a result, as shown in FIG. 9, defective meshing is liable to occur where only some projection portions 102 are meshed with drive wheel teeth 121eb, and remaining other projection portions 102 are not meshed with drive wheel teeth 121eb. This defective meshing causes abnormal abrasion.

To the contrary, according to this embodiment, as shown in FIGS. 8 and 9(C), projection portion 2b has height h greater than or equal to depth d of tooth groove 21ea. With such a configuration, a distal end of projection portion 2b can be brought into contact with the bottom portion of tooth groove 21ea. Accordingly, it is possible to prevent rail surface 2a of track link 1 and center outer peripheral surface 21da of drive wheel 21 which opposedly faces rail surface 2a from coming into contact with each other. Accordingly, it is possible to prevent sliding abrasion between rail surface 2a of track link 1 and the above-mentioned center outer peripheral surface 21da of drive wheel 21.

Further, sliding abrasion between rail surface 2a of track link 1 and center outer peripheral surface 21da of drive wheel 21 can be prevented as described above and hence, it is possible to suppress displacement of a meshing pitch caused by difference in abrasion speeds between the respective parts. Accordingly, abnormal abrasion attributed to defective meshing can be suppressed.

As shown in FIG. 9(A), in this embodiment, center outer peripheral surface 21da of drive wheel 21 has diameter A smaller than or equal to tooth tip circle diameter B of drive wheel teeth 21eb over the entire circumference. With such a configuration, it is possible to prevent a contact between rail surface 2a of track link 1 and center outer peripheral surface 21da of drive wheel 21 which opposedly faces rail surface 2a with certainty. Accordingly, it is possible to prevent above-mentioned sliding abrasion between rail surface 2a of track link 1 and center outer peripheral surface 21da of drive wheel 21.

As shown in FIG. 3, in this embodiment, drive wheel segment 21b is formed of a part separate from drive wheel body 21a, and is mounted on drive wheel body 21a by fixtures 21c. With such a configuration, when drive wheel segment 21b is broken or is abraded, drive wheel segment 21b can be exchanged by removing drive wheel segment 21b from drive wheel body 21a. Accordingly, it is unnecessary to exchange the whole drive wheel 21.

As shown in FIG. 4, in this embodiment, in a state where drive wheel segment 21b is mounted on drive wheel body 21a, drive wheel segment 21b is brought into contact with recessed portions 21aa of drive wheel body 21a. With such a configuration, when the traveling unit is driven due to meshing of drive wheel segment 21b with track link 1, a load (for example, a falling shock load or a tractional load) which acts on drive wheel segment 21b from track link 1 can be received by recessed portions 21aa of drive wheel body 21a. Accordingly, it is possible to prevent the above-mentioned load from acting on fixtures 21c and hence, durability can be enhanced.

As shown in FIGS. 4 and 5, in this embodiment, indented portion 21dd of drive wheel segment 21b opens on center outer peripheral surface 21da of drive wheel segment 21b. With such a configuration, a stress which acts on drive wheel segment 21b can be released by opening 21db and hence, it is possible to suppress breakage of drive wheel segment 21b.

As shown in FIG. 6, in this embodiment, the plurality of respective protrusions 21ab of drive wheel body 21a are arranged such that the plurality of protrusions 21ab overlap with the plurality of drive wheel teeth 21eb as viewed in a side view. With such a configuration, protrusions 21ab of drive wheel body 21a and drive wheel teeth 21eb can be fixed to each other using fixtures 21c.

As shown in FIG. 6, in this embodiment, fixture 21c fixes drive wheel tooth 21eb and protrusion 21ab of drive wheel body 21a to each other. With such a configuration, fixture 21c can be arranged while avoiding tooth groove 21ea and hence, fixture 21c does not obstruct fitting of projection portion 2b of track link 1 into tooth groove 21ea.

As shown in FIG. 8, in this embodiment, as viewed in a side view, projection portion 2b of track link 1 is arranged at the center between the first link connection holes (through holes 3ba, 3ca) and the second link connection hole (through hole 3da). With such a configuration, even when drive wheel 21 is rotated either toward a normal rotation side or a reverse rotation side, it is possible to suppress relative sliding of track link 1 with respect to drive wheel 21.

As shown in FIG. 9(B), in this embodiment, projection portion 2b of track link 1 has straight line portion RC positioned on the peak portion of projection portion 2b and two arcuate portions RD which sandwich straight line portion RC therebetween as viewed in a side view. With such a configuration, it is possible to make all projection portions 2b fitted in tooth grooves 21ea of drive wheel 21 mesh with drive wheel teeth 21eb.

As shown in FIGS. 9(A) and 9(B), in this embodiment, as viewed in a side view, angle $\theta 1$ of rising from groove end portion CN to a bottom portion 21ea1 side of tooth groove 21ea with respect to first imaginary straight line SL1 which connects groove end portions CN on both sides of the tooth groove 21ea is set smaller than angle $\theta 2$ of rising from root portion BP to a distal end portion side of projection portion 2b with respect to second imaginary straight line SL2 which connects root portions BP on both sides of projection portion 2b. With such a configuration, tooth groove 21ea can smoothly receive projection portion 2b and hence, it is possible to realize smooth meshing between drive wheel 21 and track links 1.

It should be construed that the embodiment disclosed herein is only for an exemplifying purpose in all aspects and is not limited. The scope of the present invention is not designated by the above-mentioned description but is designated by Claims, and it is intended that all modifications which fall within the meaning and the scope equivalent to Claims are also included in the scope of the present invention.

REFERENCE SIGNS LIST

1: track link, 2: link mounted part, 2a: rail surface, 2b: projection portion, 2b1, 21ab1, 21eb1: peak portion, 2c: mount element, 2ca, 3ba, 3ca, 3da, 3pa, 3pb, 3: link body, 3TS: track shoe plate portion, 3TSg: grouser, 3b, 3c, 3d: connecting portion, 3g, 21aa: recessed portion, 4: mounting pin, 5, 8, 21cb: bolt, 6, 9: nut, 7: connecting pin, 10: track apparatus, 20: traveling unit, 21: drive wheel, 21a: drive wheel body, 21aa2: side surface, 21aa1, 21ea1: bottom portion, 21ab: protrusion, 21b: drive wheel segment, 21c: fixture, 21ca: fixing pin, 21ca1: small-diameter portion, 21ca2: large-diameter portion, 21cc: cylindrical member, 21cd: annular member, 21d: center portion, 21da: center outer peripheral surface, 21db: opening, 21dc: outer surface indented portion, 21dd: inner surface indented portion, 21e: end portion, 21ea: tooth groove, 21eb: drive wheel tooth, 21f: through hole, 22: idler wheel, 23: track frame, 24: track roller, 24a: rolling surface, 25: carrier roller, 26: revolving apparatus, 30: revolving unit, 31: operator's cab, 32: engine room, 33: counter weight, 34: access system, 40: work implement, 41: boom, 42: dipper stick, 43: bucket, 50: hydraulic excavator

The invention claimed is:
1. A traveling unit comprising:
   a drive wheel having a plurality of drive wheel teeth and a tooth groove disposed adjacently to the drive wheel teeth; and
   a track link having projection portions which mesh with the drive wheel teeth, and a rail surface positioned between the projection portions in a width direction of the projection portions and on which a roller rolls, the width direction corresponding to an axial direction of the drive wheel, a height of the projection portions from the rail surface being set greater than or equal to a depth of a bottom surface of the tooth groove,
   wherein the bottom surface is formed between the drive wheel teeth disposed adjacent to each other in the circumferential direction of the drive wheel, and
   wherein the bottom surface opposedly faces the pro- jection portions in a radial direction of the drive wheel when the projection portions are meshed with the drive wheel teeth.

2. The traveling unit according to claim 1, wherein an outer peripheral surface of the drive wheel which opposedly faces the rail surface and is positioned in a tooth width direction of the drive wheel teeth in a state where the drive wheel teeth and the projection portions mesh with each other has a diameter less than or equal to a tooth tip circle diameter of the drive wheel teeth over the entire circumference.

3. The traveling unit according to claim 1,
wherein the drive wheel includes:
a drive wheel body;
a drive wheel segment which is formed as a part separate from the drive wheel body, is disposed on an outer periphery of the drive wheel body, and has the drive wheel teeth; and
a fixture which mounts the drive wheel segment on the drive wheel body.

4. The traveling unit according to claim 3,
wherein
the drive wheel body has a recessed portion indented toward an inner peripheral side on an outer peripheral portion thereof, and
in a state where the drive wheel segment is mounted on the drive wheel body, the recessed portion is brought into contact with the drive wheel segment.

5. The traveling unit according to claim 3,
wherein
the drive wheel body has a plurality of protrusions projecting toward an outer peripheral side on an outer peripheral portion,
the drive wheel segment has a plurality of indented portions which are indented such that the indented portions extend toward an outer peripheral side from an inner peripheral surface of the drive wheel segment, and respectively receive the protrusions, and
the plurality of indented portions each open on an outer peripheral surface of the drive wheel segment.

6. The traveling unit according to claim 5, wherein the plurality of protrusions are arranged such that each of the plurality of protrusions overlap with a corresponding one of the plurality of drive wheel teeth as viewed in a side view.

7. The traveling unit according to claim 6, wherein the fixture fixes each of the drive wheel teeth and each of the protrusions of the drive wheel body to each other.

8. The traveling unit according to claim 1,
wherein
the track link has a first link connection hole and a second link connection hole, and
as viewed in a side view, the projection portion is arranged at the center between the first link connection hole and the second link connection hole.

9. The traveling unit according to claim 1, wherein the projection portion has a straight line portion positioned on a peak portion of the projection portion, and two arcuate portions which sandwich the straight line portion therebetween as viewed in a side view.

10. The traveling unit according to claim 1, wherein as viewed in a side view, an angle of rising from a groove end portion to a bottom portion side of the tooth groove with respect to a first imaginary straight line which connects groove end portions on both sides of the tooth groove is set smaller than an angle of rising from a root portion to a distal end portion side of the projection portion with respect to a second imaginary straight line which connects root portions on both sides of the projection portion.

11. A work vehicle including the traveling unit according to claim 1.

* * * * *